United States Patent
Malinin

(10) Patent No.: US 10,116,207 B1
(45) Date of Patent: Oct. 30, 2018

(54) HYSTERETIC CONTROLLER WITH FIXED-FREQUENCY CONTINUOUS CONDUCTION MODE OPERATION

(71) Applicant: DIALOG SEMICONDUCTOR (UK) LIMITED, London (GB)

(72) Inventor: Andrey Malinin, Campbell, CA (US)

(73) Assignee: DIALOG SEMICONDUCTOR (UK) LIMITED, London (GB)

( * ) Notice: Subject to any disclaimer, the term of this patent is extended or adjusted under 35 U.S.C. 154(b) by 0 days.

(21) Appl. No.: 15/678,060

(22) Filed: Aug. 15, 2017

(51) Int. Cl.
*H02M 3/157* (2006.01)
*H02M 3/156* (2006.01)

(52) U.S. Cl.
CPC .......... *H02M 3/157* (2013.01); *H02M 3/156* (2013.01)

(58) Field of Classification Search
CPC ...... H02M 3/156; H02M 3/155; H02M 3/158; H02M 3/157; H02M 3/1563; H02M 2001/0009

USPC ................................. 323/222, 271, 282–285
See application file for complete search history.

(56) References Cited

U.S. PATENT DOCUMENTS

| | | | |
|---|---|---|---|
| 2008/0315853 A1* | 12/2008 | Capilla | H02M 3/1588 323/288 |
| 2012/0326688 A1* | 12/2012 | Sun | H02M 3/1588 323/283 |

* cited by examiner

*Primary Examiner* — Nguyen Tran
(74) *Attorney, Agent, or Firm* — Haynes and Boone, LLP

(57) ABSTRACT

A switching power converter with a hysteretic current-mode controller switches at a fixed frequency responsive to a pulse generator that pulses a set signal and a reset signal at the fixed frequency. A power switch in the switching power converter is configured to close responsive to the pulsing of the set signal and to open responsive to the pulsing of the reset signal.

13 Claims, 4 Drawing Sheets

HYSTERETIC CONTROLLER WITH FIXED-FREQUENCY CONTINUOUS CONDUCTION MODE OPERATION

TECHNICAL FIELD

This application relates to power converters, and more particularly to a switching power converter having hysteretic control with fixed-frequency continuous conduction mode operation.

BACKGROUND

There are two main control methodologies for a switching power converter: voltage-mode control, and current-mode control. Voltage-mode control requires only one control loop such as performed in the comparison of a control signal to a ramp signal for pulse width modulating the power switch. An error amplifier compares the output voltage to a reference voltage to generate the control signal. In contrast, current-mode control requires two loops because one loop is necessary for feeding back the inductor current to form the control signal in addition to the loop feeding back the output voltage. Each control method has its own set of advantages and disadvantages. Hysteretic current-mode controllers in particular have advantageous response speed to load transients in the output voltage. In a hysteretic current-mode controller, the hysteresis of a comparator sets the ripple for the inductor current.

An example hysteretic current-mode controlled buck converter 100 is shown in FIG. 1. An operational transconductance amplifier (OTA) 105 generates an error current (Ierr) responsive to a difference between an output voltage Vout and a reference voltage Vref multiplied by its transconductance gain gm. The error current thus equals gm*(Vout−Vref). Should the output voltage be less than the reference voltage, the error current will thus discharge an inverting input to a hysteresis comparator 110 below its grounded non-inverting input such that the output of hysteresis comparator 110 is driven high. This high output of hysteresis comparator 110 switches on the high-side switch (S0) for buck converter 100 and also switches on switch S01 that couples between the inverting input to hysteresis comparator 110 and ground. With the high-side switch S1 on, an input voltage AVDD drives a magnetizing current Iind into an inductor L. A low-side switch S1 controlled by another hysteresis comparator 125 is off while the magnetizing current flows through high-side switch S0.

A current mirror 115 mirrors the magnetizing current Iind into a mirrored current Iind/N that a fraction 1/Nth of the magnetizing current. A hysteresis current Ih/N flows through switch S01. As the magnetizing current increases to be greater than a sum of the error current and the hysteresis current, the inverting input of hysteresis comparator is charged sufficiently above ground such that the output of hysteresis comparator 110 is pulled low, which switches off the high-side switch S1 and switch S01. An inverting input to hysteresis comparator 125 that is connected to the input node for inductor L1 is then charged low due to the stored magnetic energy in inductor L1 such that hysteresis comparator 125 switches on the low-side switch S1. The inductor current flowing through low-side switch S1 is then mirrored by another current mirror 120 into the current Iind/N. The resulting discharge by inductor L1 charges an output capacitor C with the output voltage Vout so that a load (represented by a resistor RLoad) may be powered accordingly.

Although the resulting hysteretic current-mode control for buck converter 100 advantageously responds to load transients, note that the switching frequency is indeterminate. In particular, the switching frequency will vary depending upon the input voltage and the load. It is thus known to modify hysteretic current-mode switching converters to achieve a fixed switching frequency but such modifications introduce control and implementation complexities.

Accordingly, there is a need in the art for improved hysteretic-controlled switching power converters having a fixed switching frequency.

SUMMARY

To address the need in the art for the improved fixed frequency switching power converters with hysteretic controllers, a switching power converter is provided with a pulse generator that generates a set pulse signal that pulses at the desired switching frequency. The pulse generator also generates a reset pulse signal that pulses at the desired switching frequency in quadrature with the set pulse signal. The switching power converter also includes a hysteretic comparator that generates a high-switch-on command responsive to an error signal. A first logic gate processes the high-switch-on command with the set pulse signal to produce a set signal for a latch. Similarly, a second logic gate processes a complement of the high-switch-on command with the reset pulse signal to produce a reset signal for the latch. When the latch is set, the high-side switch is switched on and the low-side switch switched off Conversely, when the latch is reset, the high-side switch is switched off and the low-side switch switched on.

The resulting control is quite advantageous in that with the mere addition of the latch, the first and second logic gates, and the pulse generator, a conventional hysteretic current-mode switching power converter is forced to switch at the fixed frequency for the set and reset pulse signals. These advantageous features may be better appreciated from the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
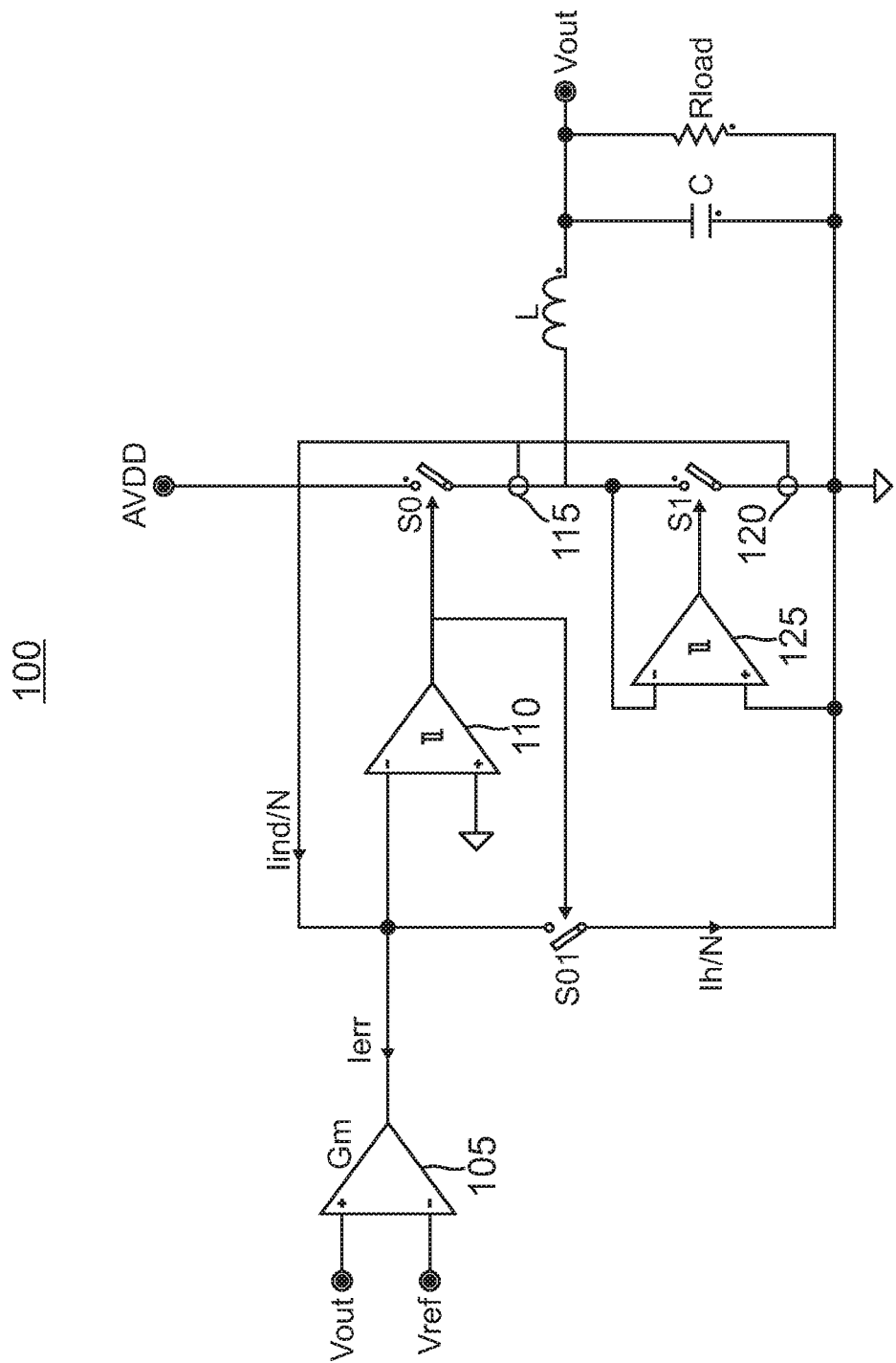
FIG. 1 is a diagram of a conventional hysteretic current-mode buck converter.
Figure 2:
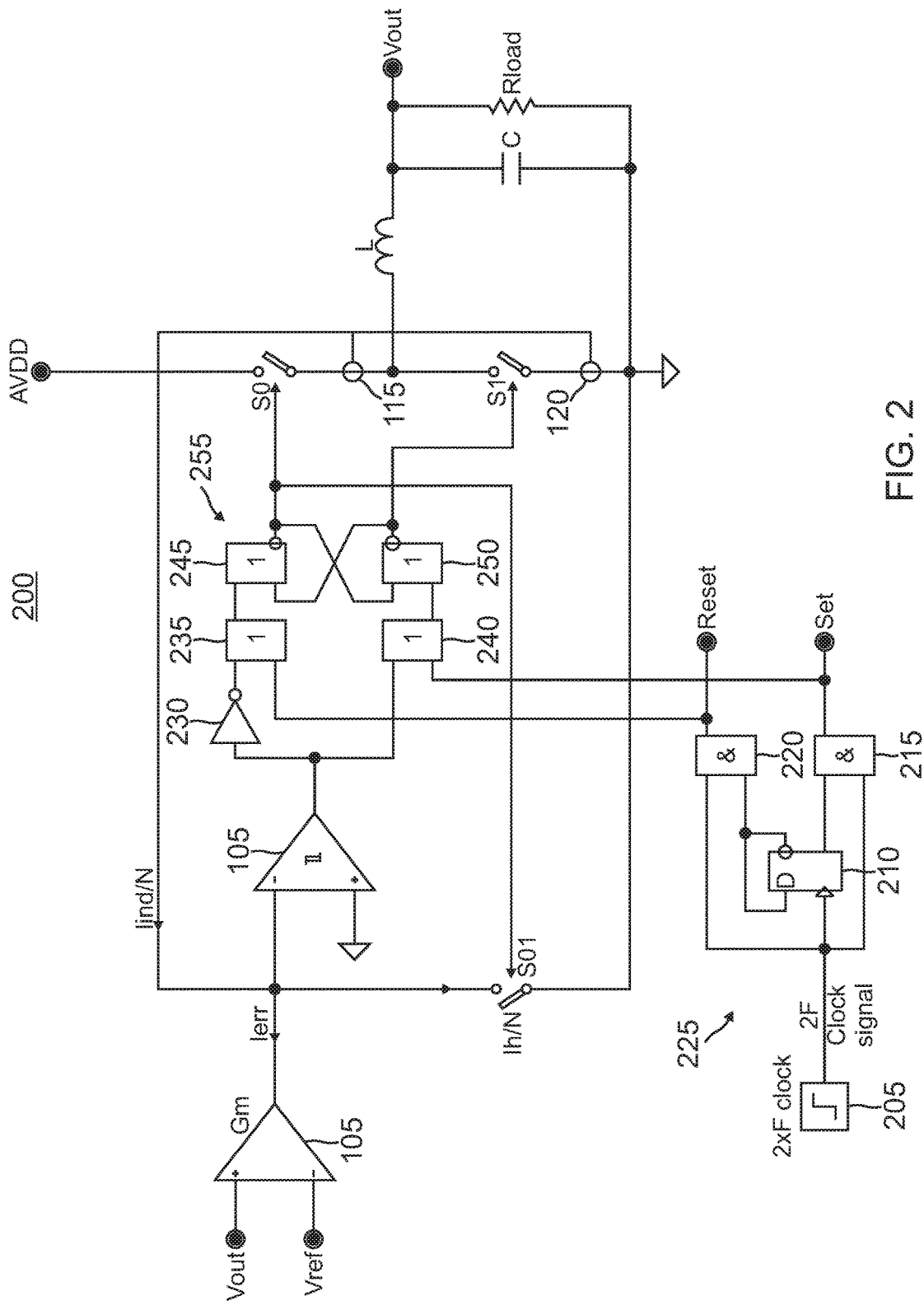
FIG. 2 is a diagram of a fixed-frequency hysteretic current-mode buck converter in accordance with an aspect of the disclosure.

A fixed-frequency hysteretic current-mode-controlled buck converter 200 is shown in FIG. 2. A pulse generator 225 includes a flip-flop 210 clocked by a 2F clock signal from a clock source 205, where 2F is twice the desired fixed switching frequency F for buck converter 200. A Q output from flip-flop 210 is ANDed with the 2F clock signal in an AND gate 215 to produce a set signal that pulses at the desired fixed switching frequency F. The Q bar output from flip-flop 210 is feedback to form its data (D) input. The Q bar output from flip-flop 210 is also ANDed with the 2F clock signal in an AND gate 220 to produce a reset signal that pulses at the fixed switching frequency F. It may readily be shown that the resulting pulse widths for the set and reset signals is ¼ the period for the fixed switching frequency F. The reset signal pulses in quadrature with the set signal. For example, at a first rising edge of the 2F clock signal, the set signal is pulsed. The reset signal is then pulsed at a second rising edge of the 2F clock signal, whereupon the set signal is pulsed at a third rising edge, and so on.

As discussed with regard to conventional buck converter 100, buck converter 200 includes an operational transconductance amplifier (OTA) 105 that generates an error current Ierr responsive to a product gm*(Vout−Vref). Similarly, current mirrors 115 and 120 function as discussed with regard to conventional buck converter 100. The output voltage Vout is received at a non-inverting input for OTA 105 whereas the reference voltage Vref is received at its inverting input. If the output voltage is lower than the reference voltage, the error current Ierr will thus be negative such that it flows into an output node for OTA 105 and discharges an inverting input of a hysteretic comparator 110. The inverting input for OTA 105 is grounded such that the output of hysteretic comparator 110 will be driven high as the error current discharges the inverting input sufficiently below ground.

Buck converter 200 includes a latch 255 formed by a cross-coupled pair of NOR gates 245 and 250. An assertion of the output of NOR gate 245 closes the high-side switch S0 and opens the low-side switch S1 whereas an assertion of the output of NOR gate 250 closes the low-side switch S1 and opens the high-side switch S0. An OR gate 240 ORs the set pulse signal with the output of hysteresis comparator 110 to drive a set input for latch 255. In particular, should the output of OR gate 240 go high, the output of NAND gate 250 is forced low. The output of hysteresis comparator 110 is inverted in an inverter 230 to be ORed in an OR gate 235 with the reset signal to drive a reset input for latch 255. Should the hysteresis comparator output signal be high, the output of inverter 230 will be low. If the reset signal is low, the output of OR gate 230 will also be a logical zero such that output of NOR gate 245 goes high to close the high-side switch S0. The high-side switch will thus be closed responsive to either the output of hysteresis comparator 110 being asserted or the set signal being pulsed.

Conversely, a pulsing of the reset signal causes the output of OR gate 235 to go high, which causes the output of NOR gate 245 to go low. The pulsing of the reset signal thus causes the high-side switch S0 to open. At the same time, the low output from NOR gate 245 causes the output of NOR gate 250 to go high. In particular, note that the set signal will be low while the reset signal is pulsed such that the output of OR gate 240 is low. NOR gate 250 would thus be NORing two logical zero signals so that it switches the low-side switch S1 on in response to the pulsing of the reset signal.

Figure 3:
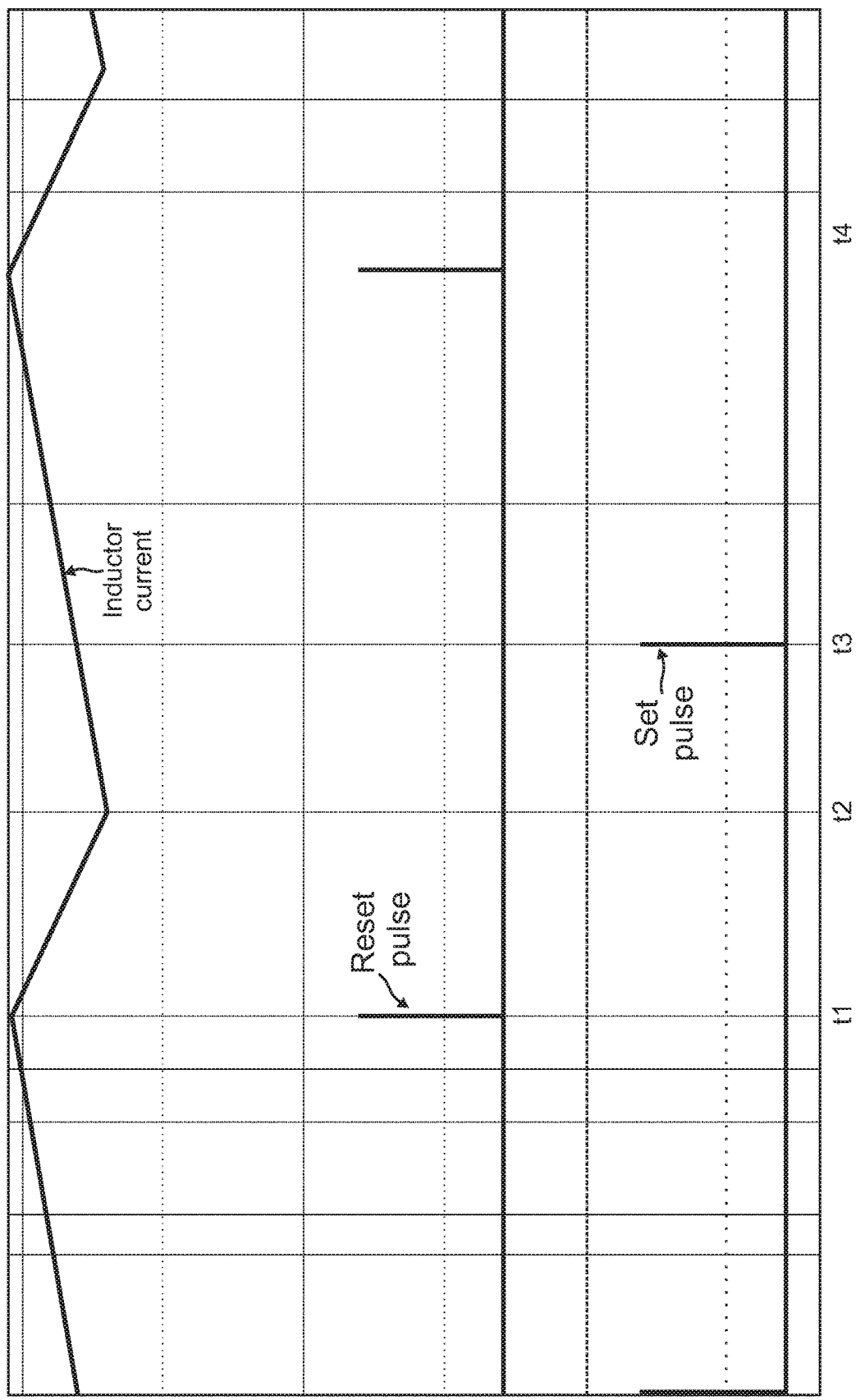
FIG. 3 illustrates the inductor current, set, and reset waveforms for the buck converter of FIG. 2 during operation with the duty cycle being greater than 50%.

The pulsing of the set signal has no effect if the output of hysteresis comparator 110 was already high prior to the set signal pulsing. In that case, it is the reset signal that will control the switching frequency for buck converter 200 as shown in FIG. 3. The resulting duty cycle for buck converter 200 will be over 50%. A discharge of the inductor current is triggered at a time t1 in response to the pulsing of the reset signal. At time t2, the output voltage has dropped below the reference voltage Vref so OTA 105 (FIG. 2) triggers the high-side switch S0 to close so that the inductor current increases. At a time t3, the pulsing of the set signal has no effect since the high-side switch S0 is already closed. At a time t4, the reset signal again pulses to begin another discharge of the inductor current. Since it the discharge of the inductor L1 that responds to the low-side switch S1 being switched on in response to the pulsing of the reset signal, the resulting control is a trailing edge peak current control mode of operation for buck converter 200.

Figure 4:
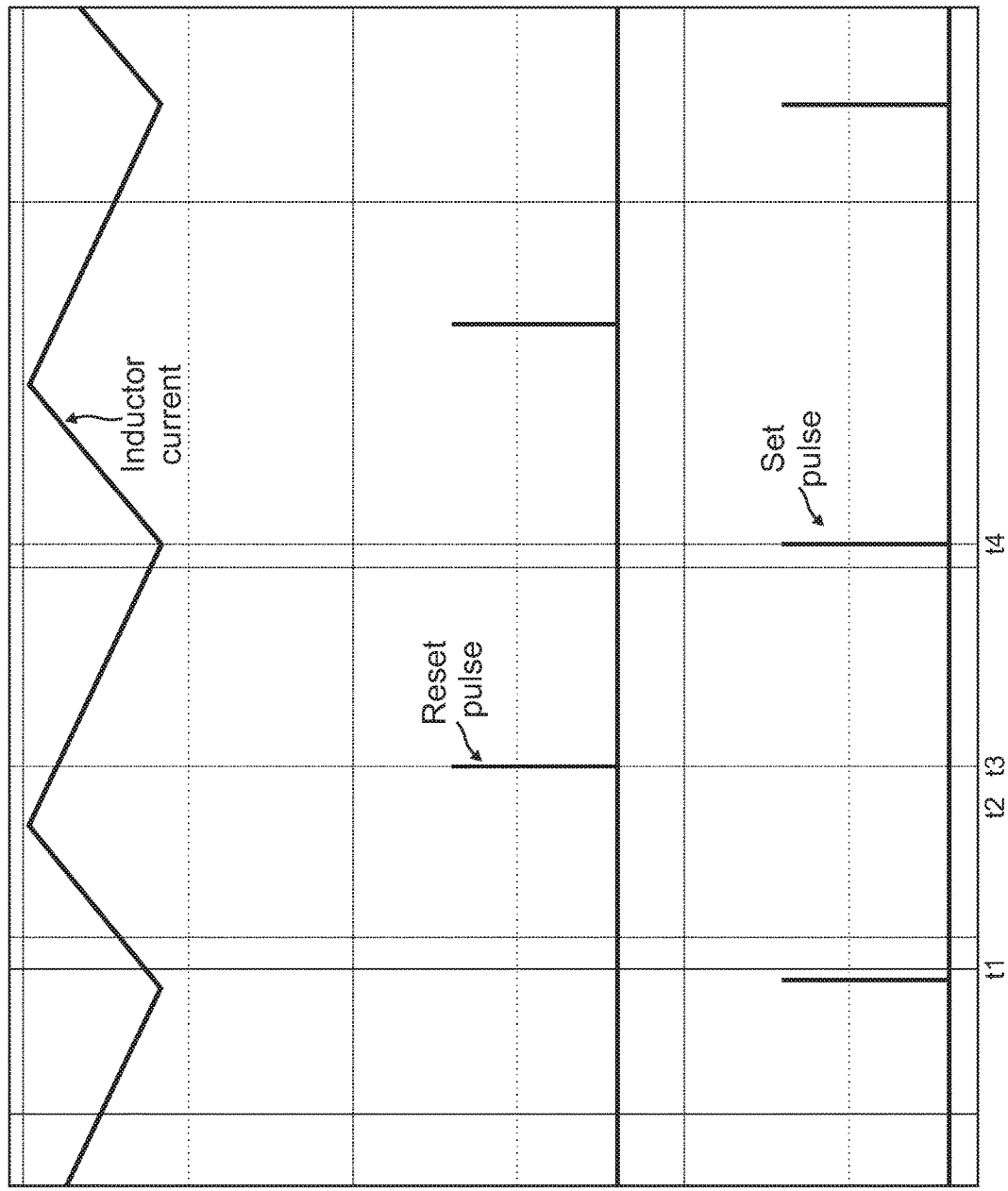
FIG. 4 illustrates the inductor current, set, and reset waveforms for the buck converter of FIG. 2 during operation with the duty cycle being less than 50%.

Conversely, FIG. 4 illustrates the waveforms resulting from operation while the duty cycle is less than 50%. At a time t1, the set signal pulses to close the high-side switch S0 and cause the inductor current to begin increasing. At a time t2, OTA 105 opens the high-side switch S0 and closes the low-side switch S1 to cause the inductor current to begin decreasing. The reset signal pulses at a time t3 but has no effect since the low-side switch S1 is already closed. The pulsing of the set signal at a time t4 opens the low-side switch S1 and closes the high-side switch S0 to again cause the inductor current to begin increasing. The set signal pulsing will thus control the switching on of the high-side switch S0 such that the resulting control is a leading edge peak current control mode of operation for buck converter 200. Regardless of the duty cycle, the resulting switching frequency for buck converter 200 is advantageously fixed at the desired switching frequency F with the use of just a latch 255, OR gates 235 and 240, and pulse generator 225.

A fixed switching frequency for buck converter 200 is of course not compatible with a pulse frequency mode of operation in which the switching frequency must be adjusted. Buck converter 200 may thus include a reverse current detector (not illustrated) for low-side switch S1 to detect whether the low-side switch S1 is conducting a reverse current. The reverse current detector would then disable pulse generator 225 to allow a controller (not illustrated) to control the high-side switch S0 and low-side switch S1 in a pulse frequency mode of operation.

Although the preceding discussion was directed to a buck converter, it will be appreciated that the concepts and techniques disclosed herein are readily applicable to other types of switching power converters that include a hysteretic current-mode controller. Moreover, note that latch 255 may be formed by a pair of cross-coupled NAND gates in an alternative embodiment. In such an embodiment, the set and reset signals are active low as compared to being active high for a cross-coupled NOR gate latch. In addition, the low-side switch may be replaced by a diode in alternative embodiments.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. A switching power converter, comprising:
a hysteresis comparator configured to respond to an error current signal to produce a comparator output signal;
a pulse generator configured to generate a set pulse signal that is pulsed at a fixed frequency and configured to generate a reset pulse signal that is pulsed at the fixed frequency;

a first logic gate configured to process the comparator output signal with the set pulse signal to generate a latch set signal;

an inverter for inverting the comparator output signal to form an inverted comparator output signal;

a second logic gate configured to process the inverted comparator output signal with the reset pulse signal to generate a latch reset signal;

an operational transconductance amplifier configured to amplify a difference between an output voltage for the switching power converter and a reference voltage to generate the error current signal;

a clock source for clocking the pulse generator with a clock signal, wherein the clock signal has a switching frequency equal to twice the fixed frequency;

a power switch; and a latch configured to close the power switch in response to an assertion of the latch set signal and configured to open the power switch in response to an assertion of the latch reset signal.

2. The switching power converter of claim 1, wherein the first logic gate is a first NOR gate and wherein the second logic gate is a second NOR gate.

3. The switching power converter of claim 1, wherein the latch comprises a pair of cross-coupled logic gates.

4. The switching power converter of claim 3, wherein the pair of cross-coupled logic gates comprises a pair of cross-coupled NOR gates.

5. The switching power converter of claim 1, wherein the switching power converter is a buck converter, and wherein the power switch is a high-side switch for the buck converter.

6. The switching power converter of claim 5, further comprising a low-side switch, wherein the latch is further configured to switch on the low-side switch in response to the assertion of the latch reset signal.

7. The switching power converter of claim 1, wherein the pulse generator comprises a flip-flop clocked by the clock signal.

8. The switching power converter of claim 7, wherein the pulse generator further comprises:

a first AND gate configured to process the clock signal and a Q output from the flip-flop for generating the set signal; and a second AND gate configured to process the clock signal and a complement Q output from the flip-flop for generating the reset signal, wherein the flip-flop is configured to receive the complement Q output at a data input for the flip-flop.

9. A method for controlling a switching power converter, comprising:

clocking a pulse generator with a clock signal to generate a set pulse signal that pulses at a fixed frequency and to generate a reset pulse signal that pulses at the fixed frequency, wherein the clock signal has a switching frequency equal to twice the fixed frequency;

amplifying a difference between an output voltage for the switching power converter and a reference voltage to generate an error current;

generating a comparator output signal from a hysteresis comparator responsive to the error current;

processing the comparator output signal with the set pulse signal in a first logic gate to generator a latch set signal;

inverting the comparator output signal to produce an inverted comparator output signal;

processing the inverted comparator output signal with the reset pulse signal in a second logic gate to generate a latch reset signal;

setting a latch responsive to an assertion of the latch set signal;

closing a power switch responsive to the setting of the latch;

resetting the latch responsive to an assertion of the latch reset signal; and opening the power switch responsive to the resetting of the latch.

10. The method of claim 9, wherein closing the power switch comprises closing a high-side switch for a buck converter, and wherein opening the power switch comprises opening the high-side switch.

11. The method of claim 9, wherein generating the set pulse signal comprises generating the set pulse signal so that it the set pulse signal pulses at the fixed frequency in quadrature with the pulsing of the reset pulse signal.

12. The method of claim 10, further comprising:

disabling the pulse generator responsive to a detection of a reverse current through a low-side switch.

13. The method of claim 9, wherein generating the error current comprises processing the output voltage and the reference voltage through an operational transconductance amplifier.

* * * * *